United States Patent
Chen et al.

(10) Patent No.: US 6,659,246 B2
(45) Date of Patent: Dec. 9, 2003

(54) EXTENDABLE AND RETRACTABLE TELEPHONE CORD APPARATUS

(76) Inventors: Jay E. Chen, 2923 Oakland Dr., Sugar Land, TX (US) 77479; Joe C. Adriano, 842 E. Vista Del Cielo, Nogales, AZ (US) 85621; Yu-Jen Hsu, 12F, No. 316, Chung Cheng Road, Hsin Chuang City 242 Taipei Hsien (TW)

( * ) Notice: Subject to any disclaimer, the term of this patent is extended or adjusted under 35 U.S.C. 154(b) by 123 days.

(21) Appl. No.: 10/120,110

(22) Filed: Apr. 11, 2002

(65) Prior Publication Data

US 2003/0192761 A1 Oct. 16, 2003

(51) Int. Cl.[7] ................................................ H02G 11/00
(52) U.S. Cl. .................................................. 191/12.2 R
(58) Field of Search ........................ 191/12 R, 12.2 R, 191/12.4, 12.2 A

(56) References Cited

U.S. PATENT DOCUMENTS

| | | | | |
|---|---|---|---|---|
| 4,946,010 A | * | 8/1990 | DiBono | 191/12.2 R |
| 5,117,456 A | * | 5/1992 | Aurness et al. | 191/12.2 R |
| 6,035,983 A | * | 3/2000 | Benner | 191/12.2 R |
| 6,349,808 B1 | * | 2/2002 | Bryant | 191/12.2 R |
| 6,447,330 B1 | * | 9/2002 | Neiser | 191/12.2 R |

* cited by examiner

*Primary Examiner*—S. Joseph Morano
*Assistant Examiner*—Robert J. McCarry, Jr.
(74) *Attorney, Agent, or Firm*—Bill B. Berryhill

(57) ABSTRACT

Telephone cord apparatus providing a wall mounted device from which a telephone cord may be extended and/or retracted. The cord is mounted on a reel which is engaged by a spring, biasing the reel toward a retracted position. A catch and release mechanism maintains the cord in an extended position until retraction is desired. The catch and release mechanism is manually engageable from the mounting plate to release the reel, allowing the spring to automatically retract and wind the cord upon the reel and into the housing.

8 Claims, 3 Drawing Sheets

EXTENDABLE AND RETRACTABLE TELEPHONE CORD APPARATUS

BACKGROUND OF THE INVENTION

1. Field of the Invention

The present invention pertains to telephone apparatus. More specifically, the present invention pertains to telephone cord apparatus which allows a telephone cord to be extended from or retracted into a wall mounting.

2. Description of the Prior Art

Telephone cords are typically provided with plugs at opposite ends thereof. The plug at one end of the cord is plugged into a wall receptacle and the plug at the opposite end is plugged into a telephone instrument. If the cord is of excessive length it may lie on the floor and be exposed to damage or cause people to trip over the cord. If the cord is too short, it limits the range of the person using the telephone instrument and/or the locations at which the telephone instrument may be placed.

Various attempts have been made to provide telephone cords which are extendable and retractable. While some of these devices, such as the one shown in U.S. Pat. No. 5,117,456, do allow extension and retraction of a telephone cord they are relatively cumbersome and space consuming. In one device a telephone cord is mounted on a reel in a portable housing with plugs at each end. The cord is so wound that pulling one end out of one slot causes the other end to be extended from another slot. This device requires manual rewinding and is somewhat unsightly in that the housing is always exposed midway of the extended cord. None of the prior art devices provide an extendable and retractable telephone cord which can be permanently mounted in a wall and extended for connection to a telephone instrument, at most any distance within a room, while providing retraction capabilities when such lengths are not required.

SUMMARY OF THE PRESENT INVENTION

The present invention provides extendable and retractable telephone cord apparatus for permanent mounting in a wall which has a housing projecting through the wall and in which is mounted a cord reel on which a telephone cord is wound. The free end of the telephone cord extends through an aperture in the mounting plate for attachment to a telephone plug. The cord is extendable and retractable upon rotation of the reel.

In a preferred embodiment, a spirally wound spring engages the cord reel biasing it in a direction which would effect retraction of a telephone cord. A catch and release mechanism allows the cord to be extended from the mounting plate, preventing retraction but being manually engageable from the mounting plate to release the catch mechanism to allow the cord to be retracted.

The telephone cord is wound upon the reel and each of the wires of the telephone cord at the opposite ends thereof are connected to corresponding discrete electrical contacts disposed at preselected radial intervals around a central drum of the reel. A fixed hub carried by a cover plate of the housing engages the drum reel and is provided with multiple concentrically disposed contact rings one for each of the discrete electrical contacts of the central drum. Each of the contact rings is connected to a wire which when connected to a telephone transmission line provides telephone communication through the extendable and contractible telephone cord to the telephone which may be connected by the telephone plug.

Thus, the telephone cord apparatus of the present invention provides a wall mounted device from which a telephone cord may be extended and/or retracted. The cord is mounted on a reel which is engaged by a spring biasing the reel toward a retracted position. However, the catch and release mechanism maintains the cord in an extended position until retraction is desired. Then the catch and release mechanism is manually engageable from the mounting plate to release the reel, allowing the spring to automatically retract and wind the cord upon the reel and into the housing. This is a permanent arrangement which is much more compact, pleasing to the eye and less likely to cause damage to a cord or tripping of individuals in a tangled area. Many other objects and advantages of the invention will be apparent from reading the description which follows in conjunction with the accompanying drawings.

DESCRIPTION OF PREFERRED EMBODIMENT OF THE INVENTION

Figure 1:
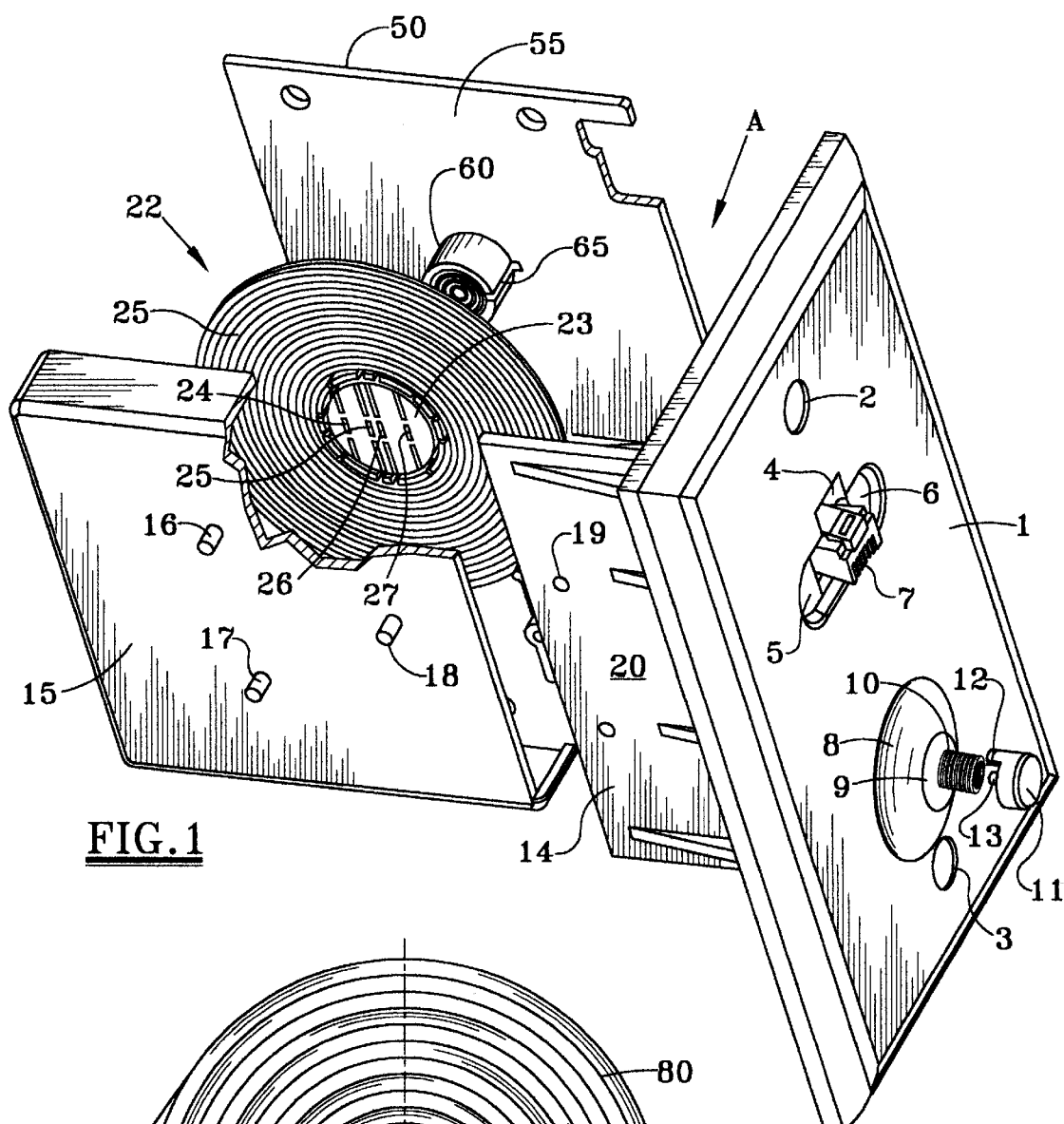
FIG. 1 is a partially exploded view of the extendable and retractable telephone cord apparatus of the present invention as viewed from the mounting plate by which the apparatus is attached to a wall, according to a preferred embodiment thereof.
Figure 2:
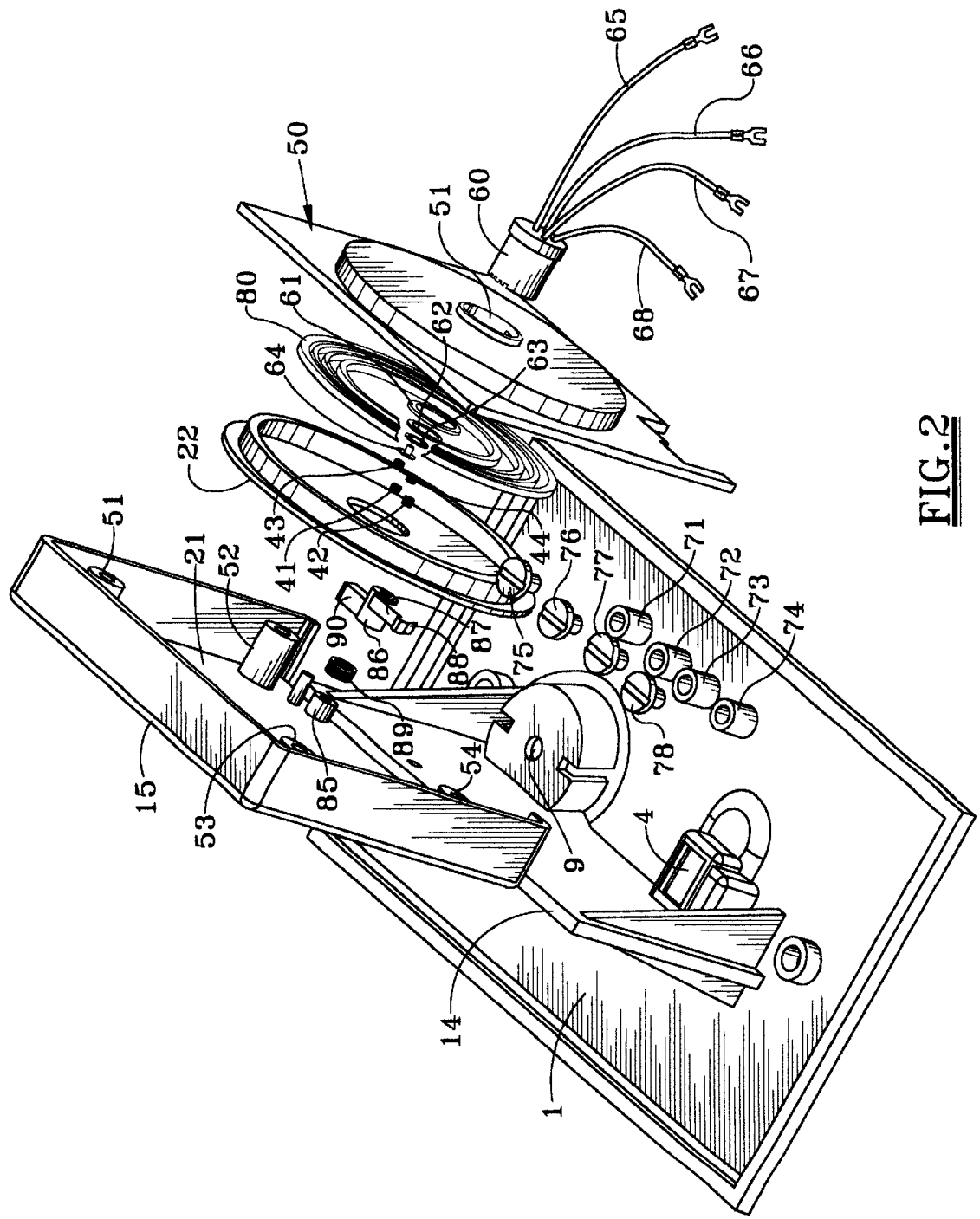
FIG. 2 is an exploded view of the extendable and retractable telephone cord apparatus of the present invention from behind the mounting plate thereof, according to a preferred embodiment thereof.

Referring first to FIGS. 1 and 2, there is shown an extendable and retractable telephone cord apparatus A, according to a preferred embodiment of the invention. Parts of it are disassembled and portions of one of the parts is broken away in FIG. 1 so as to better understand the components thereof. The apparatus A is provided with a wall mounting plate 1 which is provided with holes 2 and 3 for receiving screws (not shown) for mounting the apparatus A in a wall (not shown). The sheetrock or other material of the wall would have a hole cut therein to allow portions of the apparatus A behind the mounting plate 1 to be inserted therethrough. The hole would be smaller than the mounting plate 1 so that it would be totally covered by the mounting plate 1. The mounting plate 1 would have an aperture 4 therethrough, at opposite edges of which are recessed areas 5 and 6 for manually grasping a telephone plug 7 extending from the wall mounting plate 1. At the lower end of the mounting plate 1 is a semi-spherical raised area 8 having an aperture 9 through which is inserted a coil spring 10 and mounted in which is a button or cap 11 which has ribs 12 thereon. When inserted through the rear of the mounting plate 1, the cap or button 11 is biased outwardly by the spring 10 but remains within the aperture 9 because of the engagement of the radial ribs 12 thereon. It should be noted that there is a central projection 13 from the cap 11 which can be moved inwardly of the mounting plate 1 upon compression of the spring 10 by manually engaging the cap 11.

Projecting rearwardly of the mounting plate 1 is a mounting web 14 to which a reel housing 15 may be affixed in any suitable manner. In the embodiment of FIG. 1, pins 16, 17 and 18 extend from the side of the reel housing 15 for mating with corresponding holes 19, 20, etc. provided on the web 14 to which the reel housing 15 would be attached by gluing or any other means. The reel housing 15 provides a recess or enclosure which provides a flat inner surface 21 of the housing (see FIG. 2).

Mounted within the housing recess is a cord reel 22 (see also FIGS. 1–3) including a central drum 23, mounted for rotation about a central axis which is perpendicular to the flat inner surface 21 of the housing 15. The cord reel 22 will be more fully described hereafter.

A telephone cord 25 is wound upon the reel 22, a free end of which extends through the mounting plate 1 for attachment to the telephone plug 7. The telephone cord 25 is therefore extendable and retractable upon rotation of the reel 22. Each of the multiple wires (four in the illustrated embodiment) of the telephone cord 23 is connected to a corresponding discrete electrical contacts 24, 25, 26 and 27 disposed at selected radial position at the end of the central drum 23 of the reel 22.

Figure 3:
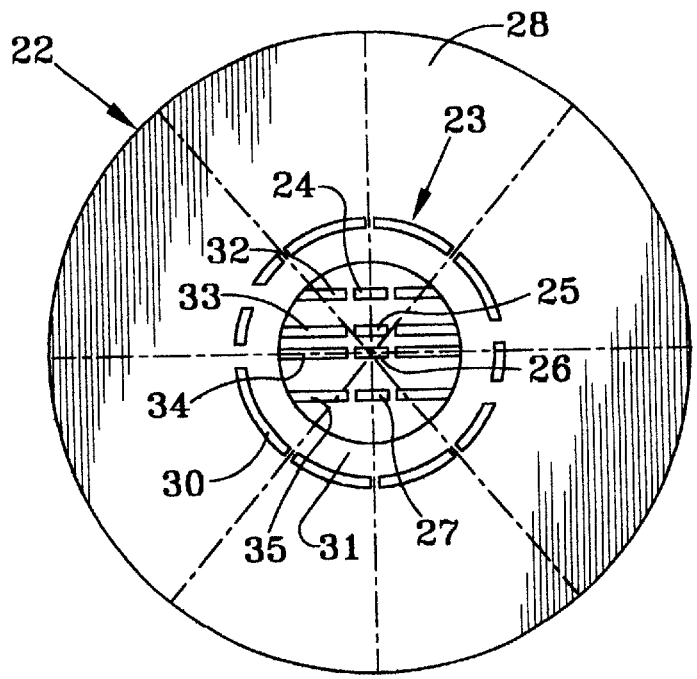
FIG. 3 is a view from one side of a cord reel which is one component of the extendable and retractable telephone cord apparatus of the present invention, according to a preferred embodiment thereof.
Figure 4:
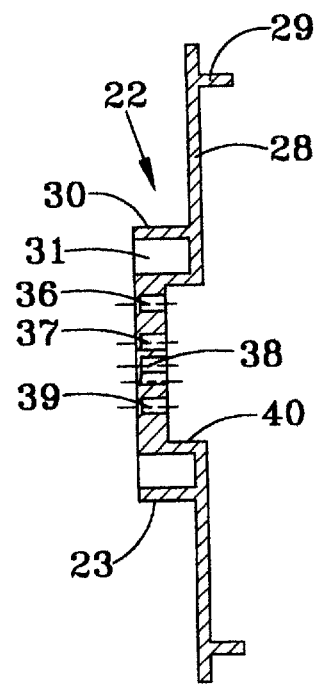
FIG. 4 is a sectional view of the cord reel of FIG. 3 taken along lines 4—4 thereof.
Figure 5:
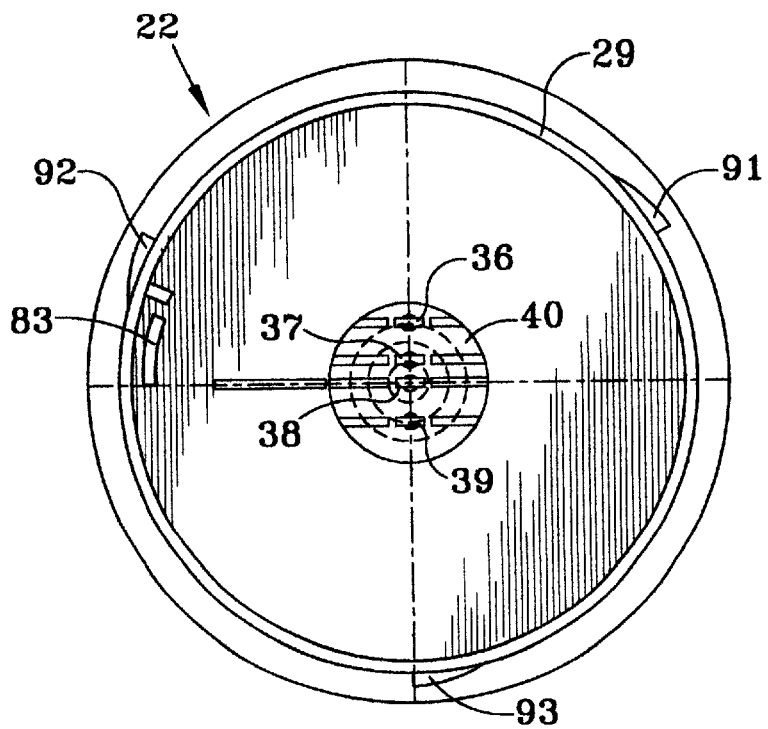
FIG. 5 is a view of the cord reel of FIGS. 3 and 4 as seen from the opposite side of FIG. 3.

For better understanding of the cord reel 22 and the elements carried thereby, reference is now made to FIGS. 3, 4 and 5. The central drum 23 of the reel 22 is recessed on one side to provide a central cavity 40. A radial wall 28 extends outwardly from the drum 23. An annular rib 29 extends from the wall 28 opposite the drum 23. The telephone cord 25 is wound around the hub 23 and when assembled is confined between the inner surface 21 of the housing and the radial wall 28 of the reel 22. Each of the multiple wires of the telephone cord extend through one of numerous slots in the outer cylindrical wall 30 of the drum 23 into annular recess 31 for connection to electrical conducting wires, such as copper, inserted through parallel slots or holes 32, 33, 34, 35 which pass transversely through the center of the drum 23. Each of the wires in one of these slots 32, 33, 34 and 35 provide the contacts 24, 25, 26, 27 which communicate with small corresponding apertures 36, 37, 38 and 39 which open into the recessed area 40 of the hub 23. Small electrical conducting pins 41, 42, 43 and 44, best seen in FIG. 2, are placed in these apertures 36, 37, 38 and 39, contacting the wires in slots 32, 33, 34 and 35 and providing corresponding discrete electrical contacts disposed at preselected radial intervals around the cavity 40 of central drum 23 which are exposed on the side of the reel 22 opposite the flat inner surface 21 of the housing 15.

A cover plate 50 is attached to the reel housing 15 in any suitable manner. In the illustrated embodiment, cylindrical post 51, 52, 53 and 54 project from the inner surface 21 of the housing 15 to aid in mounting the cover plate 50 with screws, pins, glue or any other suitable means. The cover plate has a flat inner surface 55 which, with the flat inner surface 21 of the reel housing 15, defines an enclosure in which the cord reel 22 and the telephone cord 25 wound thereon are confined for rotation about the axis of the cord reel 22.

Inserted through a central aperture 51 provided in the cover plate 50 is a hub member 60 which when pressed in place is affixed to the cover plate 50. There are multiple concentrically disposed electrical contact rings 61, 62, 63 and 64 disposed concentrically at the inner end of the hub. Each one of the rings 61, 62, 63, 64 corresponds with one of the pins 41, 42, 43 and 44 which are exposed in the recess 40 of the reel drum 23. When the apparatus A is properly assembled, the inner projecting end of the hub 60 engages the recess 40 of the cord reel 22 and each one of the discrete electrical contacts to which the telephone cord is connected on the reel 22 engages a corresponding one of the contact rings 61, 62, 63, 64. The contact rings 61–64 are connected to corresponding wires 65, 66, 67, 68 which may then be connected to a telephone transmission line (not shown) to provide telephone communication through the extendable and contractible telephone cord 25 to a telephone which may be connected to the telephone plug 7. Connecting posts 71, 72, 73, 74 and screws 75, 76, 77 and 78 may be provided for this purpose.

Figure 6:
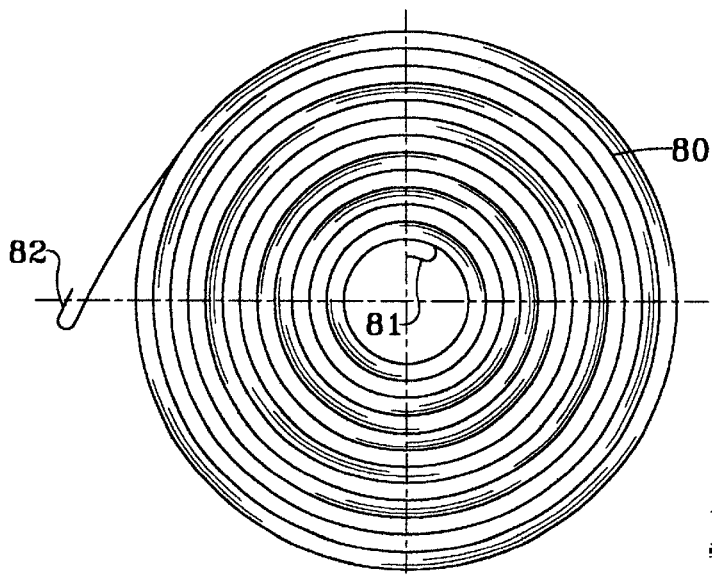
FIG. 6 is a side view of a spring component of the extendable and retractable cord apparatus of FIGS. 1–5.

The extendable and retractable telephone cord apparatus A includes spring means engaging the cord reel 22 and biasing the reel in a direction which would effect retraction of the telephone cord 25. In the exemplary embodiment, the spring means comprises a spirally wound spring 80 (see also FIG. 6) the axis of which is coaxially aligned with a central axis of the cord reel 22. In the exemplary embodiment, the spirally wound spring 80 is confined in an annular space, when assembled, defined by the exterior of the hub 60 and the annular rib 29 which projects near the outer edges of the cord reel 22. An inner end 81 of the spring 80 engages a slot 65 in the hub 60 and is thus fixed thereto. An outer end 82 of the spring 80 is fixed to the cord reel by engagement with a projection 83 thereon (see FIG. 5). Rotation of the cord reel 22 upon extension of the cord 25 causes the spring 70 to be more tightly wound, biasing the cord reel 22 toward the direction for effecting retraction of the telephone cord.

Mounted on a pin 85 carried by the housing 15 for pivoting thereabout is a catch member 86. The catch member 86 has a radial arm 87 at the distal end of which is a tooth 88. A torsion spring 89, mounted on the same axis of rotation as the catch member 86, engages another arm 90 of the catch member 86 to bias the arm 87 and tooth 88 in an inward direction. When so biased, the tooth member 78 is engageable with one or more of protuberances 91, 92, 93, disposed around the annular rib 29 of the reel 22, allowing rotation of reel 23 in a direction permitting extension of the telephone cord 25 but preventing substantial rotation in the direction for effecting retraction of the telephone cord. The arm 90 of the catch member 86 is engageable, upon compression of spring 10 by the release pin 13 of the cap 11 (manually engageable from the mounting plate 1) to overcome the torsion spring 79 and move the catch member 86, specifically the arm 87 and tooth 88 to a released position disengaging the protuberances 91, 92, 93 and allowing the wound spring 70 to rotate the reel 22 in a direction for effecting retraction of the telephone cord 25.

Thus, the telephone cord apparatus A, mounted in a wall, provides a telephone cord 25 which is wound upon reel 22 and is therefore extendable and retractable upon rotation of the reel 22. Each of the multiple wires of the telephone cord 25 are connected to corresponding discrete electrical contacts disposed at preselected intervals around the central drum 23 of the reel 22 and exposed within the drum recess 40 on the side of the reel 22 opposite the inner surface 21 of the housing 15 and in contact with concentrically disposed contact rings 61, 62, 63, 64 on the end of the drum 60. Each one of the contact rings is connected to a wire which when connected to a telephone transmission line provides telephone communication through the extendable and contractible telephone cord 25 to a telephone instrument which may be connected to the telephone plug 7. The cord may be extended, from short distances, up to the length of the telephone cord 25 wound on the reel 22. The telephone cord 25 can be retracted by manually engaging the button or cap 11 from the mounting plate 1, releasing the catch member 86 and allowing the spring 80 to move the reel 22 in a direction for retraction of the telephone cord 25.

Thus, the extendable and retractable cord apparatus of the present invention provides a compact assembly, the only portion of which is visible from the wall being the mounting plate 1. It is unique in construction and particularly in the manner in which the multiple discrete electrical contacts are provided between the rotating cord reel 22 and the stationary hub 60.

A single preferred embodiment of the invention has been described herein. However, many variations can be made by those skilled in the art without departing from the spirit of the invention. Accordingly, it is intended that the scope of the invention be limited only by the claims which follow.

What is claimed is:

1. Extendable and retractable telephone cord apparatus for mounting in a wall comprising:

a mounting plate adapted for attachment to said wall and having an aperture therein;

a reel housing attached to said mounting plate for projection through said wall, said housing providing a recess comprising a flat inner surface of said housing;

a cord reel including a central drum mounted within said housing recess for rotation about a central axis which is perpendicular to said flat inner surface;

a telephone cord of multiple wires wound around said central drum of said reel and a free end of which extends through said mounting plate aperture for attachment to a telephone plug, said telephone cord being extendable and retractable upon rotation of said reel, each of said multiple wires of said telephone cord at the opposite end thereof extending through one of numerous slots provided in an outer cylindrical wall of said central drum into a recess thereof for electrical connection with electrically conducting pins which extend through an inner portion of said drum into a recessed cavity thereof on the opposite side of said cord reel to provide corresponding discrete electrical contacts disposed at preselected radial intervals around said recessed cavity of said central drum of said reel and exposed on the side of said reel which is opposite said flat inner surface of said housing;

a cover plate attached to said reel housing having a flat inner surface which with said flat inner surface of said reel housing defines an enclosure in which said cord reel is confined for said rotation about said axis; and a fixed hub carried by said cover plate for engagement with said drum cavity having multiple concentrically disposed contact rings thereon, each one of which slidingly engages a corresponding one of said discrete electrical contacts of said central drum, each of said contact rings being connected to a wire which when connected to a telephone transmission line provides telephone communication through said extendable and contractible telephone cord to a telephone which may be connected to said telephone plug.

2. The extendable and retractable telephone cord apparatus of claim 1 including spring means engaging said cord reel and biasing said reel in a direction which would effect retraction of said telephone cord.

3. The extendable and retractable telephone cord apparatus of claim 2 in which said spring means comprises a spirally wound spring the axis of which is coaxially aligned with said central axis.

4. The extendable and retractable telephone cord apparatus as set forth in claim 3 in which said spirally wound spring is confined in an annular space defined by the exterior of said hub and an annular rib projecting from outer edges of said cord reel, an inner end of said spring being fixed to said hub and an outer end of said spring being fixed to said cord reel, rotation of said reel upon extension of said cord causing said spring to be more tightly wound for biasing said reel toward said direction for effecting retraction of said telephone cord.

5. The extendable and retractable telephone cord apparatus of claim 4 including a catch member carried by said housing and engageable with one or more protuberances disposed at the outer edges of said reel, allowing rotation in the direction to permit said extension of said telephone cord but preventing substantial rotation in said direction for effecting retraction of said telephone cord.

6. The extendable and retractable telephone cord apparatus of claim 5 including a release member engageable with said catch member moving said catch member to a released position disengaging said one or more protuberances and allowing said wound spring to rotate said reel in said direction for effecting retraction of said telephone cord.

7. The extendable and retractable telephone cord apparatus of claim 6 in which said catch member is engaged by a biasing member to bias said catch member into said engageable position with said one or more protuberances, said release member being manually engageable from said mounting plate to overcome said biasing member to move said catch member to said released position.

8. The extendable and retractable telephone cord apparatus of claim 1 in which said central drum of said cord reel is provided at the center thereof with a cylindrical recess for receiving an end of said fixed hub and about which said cord reel rotates.

* * * * *